(12) United States Patent
Haller

(10) Patent No.: US 7,919,144 B2
(45) Date of Patent: Apr. 5, 2011

(54) SHEET-OR WEB-LIKE, DECORATIVE COATING FILM AND METHOD FOR PRODUCING THE SAME

(75) Inventor: Heinz Haller, Plochingen (DE)

(73) Assignee: Suddekor GmbH, Laichingen (DE)

( * ) Notice: Subject to any disclaimer, the term of this patent is extended or adjusted under 35 U.S.C. 154(b) by 19 days.

(21) Appl. No.: 10/547,266

(22) PCT Filed: Jul. 19, 2004

(86) PCT No.: PCT/EP2004/008035
§ 371 (c)(1),
(2), (4) Date: May 3, 2006

(87) PCT Pub. No.: WO2005/009758
PCT Pub. Date: Feb. 3, 2005

(65) Prior Publication Data
US 2006/0240247 A1    Oct. 26, 2006

(30) Foreign Application Priority Data

Jul. 17, 2003 (DE) .................................. 103 32 768

(51) Int. Cl.
 *B05D 1/40* (2006.01)
 *B05D 3/02* (2006.01)
 *B05D 1/36* (2006.01)
(52) U.S. Cl. ..................... 427/331; 427/372.2; 427/379; 427/381; 427/382; 427/402; 427/407.1; 427/411
(58) Field of Classification Search ........................ None
See application file for complete search history.

(56) References Cited

U.S. PATENT DOCUMENTS

| 4,675,212 A | * | 6/1987 | Wiley et al. | ................... 427/244 |
| 5,460,857 A | * | 10/1995 | Schunck | ....................... 427/494 |
| 2004/0044116 A1 | * | 3/2004 | Olson et al. | ................... 524/502 |

FOREIGN PATENT DOCUMENTS

| DE | 41 18 731 | 12/1992 |
| DE | 42 19 446 | 1/1994 |
| DE | 44 13 619 | 6/1995 |
| DE | 195 08 797 | 9/1996 |
| EP | 0 296 395 | 12/1988 |
| WO | WO 00/22039 | 4/2000 |

* cited by examiner

*Primary Examiner* — Sheeba Ahmed
(74) *Attorney, Agent, or Firm* — Bachman & LaPointe, P.C.

(57) ABSTRACT

A method for producing a sheet-like or web-like, decorative, scratch- and/or abrasion-resistant coating material, in particular a coating film, comprising the steps:
- coating a support layer (10) made of paper and/or plastic with a liquid or pasty base layer (12) which is free of organic solvents and comprises radiation-curing resins but no heat-curing resins and also an abrasive filler, preferably an inorganic filler,
- drying the support layer (10) coated with the base layer (12), in particular by supplying heat,
- applying a covering layer (14) to the dried, non-crosslinked base layer (12), said covering layer containing a radiation-curing resin and no abrasive fillers, and
- jointly curing and/or crosslinking the covering layer and also the radiation-curing resins in the base layer by irradiating the covering layer with UV and/or electron beams.

17 Claims, 1 Drawing Sheet

SHEET-OR WEB-LIKE, DECORATIVE COATING FILM AND METHOD FOR PRODUCING THE SAME

BACKGROUND OF THE INVENTION

The present invention relates to a method for producing a sheet-like or web-like decorative coating material, in particular a coating film, to such a decorative coating film and to the use of the same.

Decorative coating films are generally known from the prior art, for example in the form of so-called finish films; they are used for example to produce furniture and by way of exception to produce laminate flooring.

Particularly in this field of use or to coat other highly stressed surfaces such as, for example, in the kitchen or industrial production sector, the abrasion resistance of a coating produced with a coating film is of particular importance. From the prior art, procedures are known in which corundum-containing, duroplastic resins are used for laminate flooring; either the corundum is contained in a paper support (which is otherwise free of fillers), which is then impregnated with melamine-formaldehyde resin, or suitable papers are impregnated with corundum-containing resins (cf. in this respect DE 195 08 797 C1 for example). Once the resin films, together with an underlying paper which has likewise been impregnated with resin (and typically printed), have been pressed onto a support plate, a decorative material with an abrasion-resistant, duroplastic coating is obtained.

An alternative procedure for producing abrasion-resistant coatings is disclosed in DE 42 19 446. Fillers (usually corundum) are introduced into radiation-curing binders, wherein the binders are then applied in liquid form to a support. Following crosslinking by irradiation with UV or electron beams, the corundum particles are fixedly bound into the crosslinked binder so that the desired coating with a high abrasion resistance is produced.

However, the two procedures from the prior art which are described above are suitable only to a limited extent and under certain prerequisites for producing film-like coatings which can be laminated and covered (that is to say which are highly flexible). This is because coatings comprising duroplastic and radiation-crosslinked binders are very brittle, especially in the case of relatively large layer thicknesses and a high crosslinking density. Moreover, the coatings produced in the above-described manner, when they exist in film form, are not flat but rather tend to curl undesirably, so that subsequent further processing is made much more difficult.

It is therefore an object of the present invention to provide a decorative coating material, in particular in the form of a decorative coating film, which is much more flexible than materials known from the prior art and thus is suitable for surface laminating and covering tasks, and which moreover exists in flat form and does not curl undesirably once the production process is complete. A method for producing such a coating material (coating film) is also to be provided.

SUMMARY OF THE INVENTION

Advantageously according to the invention, use is made of a mass for the base layer which contains resins which cure under the effect of radiation (radiation-curing) (within the context of the present invention, a "radiation-curing" resin is to be understood as meaning a resin which can be crosslinked and cured by means of electron beams or by irradiation with UV light, wherein photoinitiators may optionally be added), but do not cure under the effect of heat.

Such a binder system as base layer in the context of the present invention advantageously ensures firstly that the fillers (e.g. corundum) which give rise to the abrasion resistance can be held with a high binding action, but at the same time such a coating is also suitable for the covering layer (covering varnish) being applied in an extremely adhesive manner, wherein according to the invention the radiation crosslinking extending through two layers (covering layer and base layer) ensures good adhesion. Furthermore, the covering varnish makes it possible for the smooth corundum layer to be completely covered. Accordingly, such an arrangement produced according to the invention is then gentle on any downstream units in the production process (for example embossing or patterning plates for the resulting surface), since damaging abrasion effects can be effectively prevented.

Finally, the binder used according to the invention is characterized by high transparency, so that a patterning (e.g. a print), which according to one embodiment is formed on the underlying support layer made of paper or plastic, remains visible with a high image quality following completion of the layer arrangement.

By virtue of the described measures, the coating film thus produced exhibits a surprisingly high abrasion resistance; by applying the criteria regulated by EN 13329 to measure abrasion resistance, values considerably above 2500 revolutions are achieved, so that, in the manner described above, coatings of abrasion class AC3 can be produced, which is considerably above the value that can be achieved in the described prior art for a comparable layer thickness.

While it is preferred on the one hand to apply the covering layer without any solvents (so that the layer thickness which is advantageously in the range between approximately 10 and 30 micrometers following curing and/or crosslinking remains unchanged in the moist state), it is possible as an alternative that radiation-curing resins for the covering layer are present in an aqueous dispersion.

While it is provided according to the invention to provide the covering layer without abrasive fillers ($Al_2O_3$, $SiO_2$, etc.) and advantageously according to one embodiment without heat-curing resins, the present invention nevertheless does not rule out the possibility that pigments (for example $TiO_2$) are added to the covering layer for coloring purposes or else the resin of the covering layer is modified by means of so-called nanoparticles in order to improve the scratch resistance; for supplementary disclosure, reference may be made to WO 00/22039, which is hereby incorporated into the present disclosure in respect of the procedure for modification by means of nanoparticles.

It is moreover particularly preferred according to one embodiment to structure the covering layer prior to crosslinking. If the underlying support layer is printed or has some other patterning, it is possible, in order to produce wood fiber or grain effects, to carry out a structuring of the covering layer which corresponds to this (wood) print, by setting up the structuring tools in a manner corresponding to the underlying pattern. By virtue of the advantageous fact according to the invention that the covering layer is free of abrasive fillers, such a structuring can be achieved without much wear and in a simple manner prior to the electron beam curing or crosslinking (together with the corresponding radiation-curing components of the underlying base layer) according to the invention.

By virtue of the present invention, a coating film is advantageously obtained which is highly suitable as a laminating film. Not only does it have considerably increased flexibility properties (compared to the products known from the prior art) (so that even problematic laminating tasks, such as the covering of profile strips or parts of furniture for example, can be carried out without any problem and without tears or cracks), the product of the method according to the invention is also extremely flat and does not tend to curl or roll up in a disadvantageous manner. Not least for this reason, it is also possible according to one embodiment to provide the coating film according to the invention with a suitable sealing or hot-melt adhesive layer on the rear, so that said coating film can then be applied without any problems to a desired lamination support (e.g. a wooden panel to be coated), for example by hot-pressing or the like.

It can be seen that, unlike some products known from the prior art, the product of the method according to the invention is structurally finished, that is to say in particular no further structural or chemical modification of the coating takes place in a subsequent process of coating or laminating onto a lamination support. No change to the surface in terms of its polymeric properties therefore takes place during further processing.

Furthermore, according to one embodiment in the context of the invention, the desired degree of gloss can be adjusted by adding matting agents; degrees of gloss of between five and eighty (measured in accordance with DIN 67530 at 60°) can realistically be achieved. Furthermore or as an alternative, the scratch resistance can be further increased by adding so-called slip additives to the coating mass of the covering layer.

Not least on account of its surprising abrasion resistance, which is considerably above 2500 revolutions (measured in accordance with method S42 of the EN 13329 standard), the product of the method according to the invention or the decorative coating film according to the invention is suitable for highly stressed coating surfaces, for example flooring panels. In addition, preferred fields of use in the context of the present invention are the industrial production sector and kitchen surfaces.

Since, moreover, compared to the abrasion-resistant surfaces known from the prior art, either the abrasion properties are considerably improved or else products with comparable abrasion resistance would have a much greater layer thickness (with the associated disadvantages of brittleness and lack of suitability for coatings requiring flexibility), it is to be expected that completely new fields of use will be opened up for the scratch-resistant coating by virtue of the present invention. In this connection, it may then be noted that, not least on account of the material savings which can be made by virtue of the relatively thin layers, reductions in the production costs are possible which may be in the order of magnitude of 20%.

BRIEF DESCRIPTION OF THE DRAWINGS

Further advantages, features and details of the invention emerge from the following description of preferred examples of embodiments and with reference to the single drawing. In said drawing.

DETAILED DESCRIPTION

Figure 1:
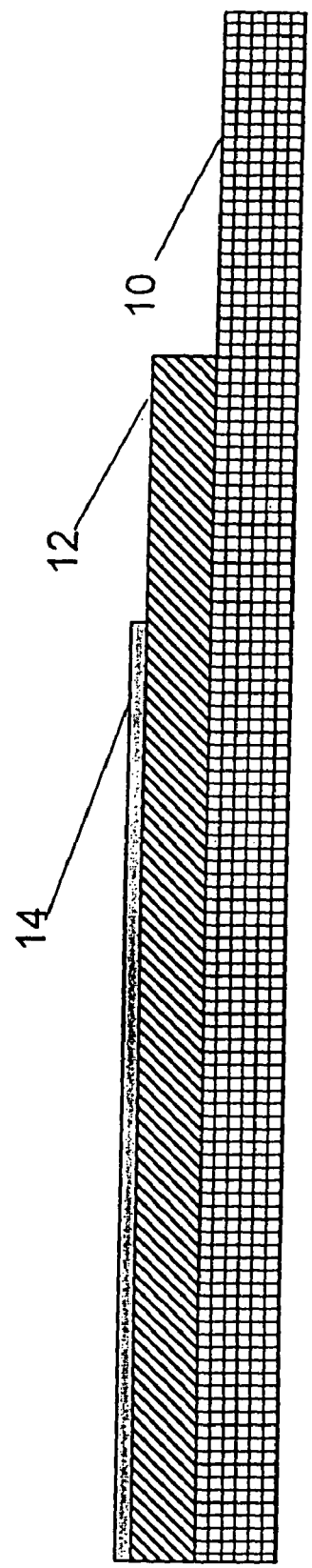
FIG. 1 shows the schematic layer structure of the decorative coating film according to a first preferred embodiment of the present invention.

The web-like support shown in FIG. 1 has a layer made of printed paper as the support layer 10, said layer typically having a thickness of 35 to 90 micrometers. The printing is effected in the direction of a two-layer coating, namely a base layer 12 applied directly to the paper layer 10 and a covering layer 14 which is in turn applied to said base layer. While the base layer 12 is formulated to achieve maximum abrasion resistance and contains abrasive, inorganic fillers (in particular $Al_2O_3$ and $SiO_2$), the covering layer serves inter alia to seal the base layer and determines the further surface properties, in particular degree of gloss, haptics and surface structure.

The base layer, which is applied using otherwise known coating units, by way of roller application, by means of a slotted nozzle or knife, with a typical layer thickness of between about 10 and 100 micrometers, contains between 22% and 95% (in the example 40%) of aqueous radiation-curing resins and also inorganic fillers in the form of the abovementioned abrasive substances and also additional color pigments (e.g. $TiO_2$) in the possible range between 10% and 70%, in the example of embodiment about 60%.

A typical recipe for producing the coating material for the base layer 12 could for example be as follows:
   60 parts of aqueous radiation-curing resin (IRR 395, 40% strength)
   40 parts of filler (Plakor 30).

The covering layer consists of a radiation-curing binder which may either be completely free of solvents or consists of a radiation-curing, aqueous dispersion (max. approx. 50% to 90% water). Suitable resins for the covering layer are polyester acrylates, epoxy acrylates or urethane acrylates, wherein these may be modified in terms of their molecular structure by means of so-called nanoparticles in order to improve the scratch resistance.

Furthermore, the degree of gloss can be adjusted in the desired manner by adding matting agents (typical degrees of gloss between 5 and 80, DIN 69530 at 60°), and also so-called slip additives may be added in order to further increase the scratch resistance.

A typical radiation-curing resin product for forming the covering layer is for example Ebecryl 1016. The application is in turn carried out by known coating possibilities, for example application by means of a roller, slotted nozzle or knife, wherein the application takes place both inline (directly after drying of the base layer) and also in a separate step, offline and in a separate coating system. The subsequent curing of the covering layer by means of irradiation (UV or electron beams) additionally gives rise to the curing of the radiation-curing components of the base layer, wherein suitable photoinitiators are added to the radiation-curing components in the case of curing by means of UV radiation.

The coating film thus produced is characterized by very high abrasion resistance, above 1500 revolutions, usually above 2500 revolutions (method S42 in accordance with standard EN 13329).

This product is a so-called finish film since binders of the covering layer and of the base layer are fully cured and crosslinked. During further subsequent processing, e.g. by laminating onto a suitable support material, no further changes to the polymeric properties take place. In particular, processing at high pressure and high temperature during the lamination operation is for this reason not necessary.

Besides the described high abrasion resistance, the film product is characterized by a high flexibility and low brittleness, so that it can be used in particular in laminating and covering systems to refine a wide range of products, such as wooden panels, strips and parts of furniture which are subjected to high mechanical stress. The high abrasion resistance makes it an ideal coating for the production of flooring panels.

The radiation-curing resins of the base layer can comprise an aqueous mixture of large-molecule and small-molecule prepolymers, wherein the particle size of the abrasive fillers is adapted to a layer thickness of the base layer (12).

The invention claimed is:

1. A method for producing a sheet or web of decorative, scratch- and/or abrasion-resistant coating material, comprising the steps:
   coating a support layer (10) made of paper and/or plastic with a liquid or pasty base layer (12) which is free of organic solvents and comprises aqueous radiation-curing resins but no heat-curing resins and also an inorganic filler,
   drying the support layer (10) coated with the base layer (12) by supplying heat,
   applying a covering layer (14) to the dried, non-crosslinked base layer (12), said covering layer containing a radiation-curing resin and no $Al_2O_3$ or $SiO_2$ fillers, and
   jointly curing and crosslinking the covering layer and also the radiation-curing resins in the base layer by irradiating the covering layer with UV and/or electron beams, wherein the crosslinking extends through both the base and covering layers.

2. The method as claimed in claim 1, wherein the liquid or pasty base layer (12) is applied in a layer thickness of between 10 and 100 micrometers and is applied in a layer thickness such that the base layer in the dried state has a thickness of between 20 and 70 micrometers, and the covering layer (14) is applied in a layer thickness of between 10 and 30 micrometers.

3. The method as claimed in claim 1, wherein the radiation-curing resins of the base layer comprise an aqueous mixture of large-molecule and small-molecule prepolymers, wherein the particle size of the abrasive fillers is adapted to a layer thickness of the base layer (12).

4. The method as claimed in claim 1, wherein anhydrous resins are used as the covering layer.

5. The method as claimed in claim 1, wherein the covering layer is structured prior to curing and/or crosslinking and the structuring of the covering layer is carried out synchronously with a pattern which is printed onto the support layer (10) prior to the base layer coating operation.

6. The method as claimed in claim 1, wherein the radiation-curing resin of the covering layer contains nanoparticles.

7. The method as claimed in claim 1, wherein the support layer is a dry web which is selected from the group consisting of preimpreganted paper with binders which can be crosslinked by heat or radiation, plastic film, wood veneer, fibrous web and flexible panel substrate.

8. The method as claimed in claim 1, wherein the drying of the base layer results in the base layer coated with the support layer having a residual moisture content of less than 1% by weight.

9. The method as claimed in claim 1, including application of a heat-reactive adhesive to a side of the support layer opposite the base layer, wherein the adhesive is applied in a weight of between 2 to 20 $g/m^2$, wherein the adhesive has a reaction temperature of <160° C.

10. The method as claimed in claim 1, including application of a heat-reactive adhesive to the a side of the support layer opposite the base layer, wherein the adhesive is applied in a weight of between 2 to 10 $g/m^2$, wherein the adhesive has a reaction temperature of <160° C.

11. The method as claimed in claim 1, including application of a heat-reactive adhesive to the a side of the support layer opposite the base layer, wherein the adhesive is applied in a weight of between 2 to 5 $g/m^2$, wherein the adhesive has a reaction temperature of <160° C.

12. The method as claimed in claim 9, wherein the adhesive is selected and arranged so that the steps of jointly curing and crosslinking the covering layer and the base layer does not activate the adhesive.

13. The method as claimed in claim 1, wherein the steps of coating the support layer, drying the coated support layer, applying the covering layer and jointly curing and crosslinking are carried out in a inline continuous process.

14. The method as claimed in claim 1, including pressing the decorative, scratch- and/or abrasion-resistant coating material onto the support made of paper, plastic, wood or wood materials by means of a static press or by means of a continuous double-belt press at a pressure in the range between 1 and 80 bar and a temperature in the range between 100° C. and 180° C.

15. The method of claim 1, wherein the inorganic filler is a powdery substance.

16. The method of claim 1, wherein the inorganic filler is selected from the group consisting of aluminum oxide, silicon oxide and combinations thereof.

17. The method of claim 1, wherein the inorganic filler is a powdery substance which provides the base layer (12) with abrasion resistance.

* * * * *